United States Patent [19]

Llewellin et al.

[11] Patent Number: 5,036,770

[45] Date of Patent: Aug. 6, 1991

[54] ACS BLOWOFF DOOR ASSEMBLY

[75] Inventors: William R. Llewellin, Littleton; Laura L. Piontek, Highlands Ranch; Michael L. Gore, Littleton, all of Colo.

[73] Assignee: The United States of America as represented by the Secretary of the Air Force, Washington, D.C.

[21] Appl. No.: 462,204

[22] Filed: Jan. 9, 1990

[51] Int. Cl.⁵ .............................................. B64C 1/14
[52] U.S. Cl. .................................. 102/293; 244/129.5
[58] Field of Search ...................... 102/293, 489, 505; 89/1.81, 1.817; 244/3.22, 129.3, 129.4, 129.5, 169

[56] References Cited

U.S. PATENT DOCUMENTS

| | | | |
|---|---|---|---|
| 2,783,007 | 2/1957 | Nociti et al. | 244/129.4 |
| 3,571,977 | 3/1971 | Abeel | 244/129.5 |
| 4,031,806 | 6/1977 | Stark et al. | 89/1.811 |
| 4,321,225 | 3/1982 | Jelinek | 264/138 |
| 4,324,167 | 4/1982 | Piesik | 89/1.8 |
| 4,471,684 | 9/1984 | Johnson et al. | 89/1.817 |
| 4,499,829 | 2/1985 | Jacobson et al. | 102/293 |
| 4,930,422 | 6/1990 | Thouron et al. | 102/293 |

Primary Examiner—Charles T. Jordan
Attorney, Agent, or Firm—William G. Auton; Donald J. Singer

[57] ABSTRACT

A protective door assembly is disclosed which will cover missile altitude control system engines during storage and launch while still being easily jettisoned when the ACS engine is fired. The titanium door attaches to the missile skin by a hook on it's lower edge and by a tapered boss which attaches to the skin and fits into a tapered hole near the door upper edge. Behind the door, the ACS engine nozzle is surrounded by a seal housing which prevents engine gases from escaping into the body of the missile and causing a pressure buildup when the engine is fired. At pressures between 35 and 60 psi, the door retainer screw fails in tension and the door is blown off.

18 Claims, 2 Drawing Sheets

ACS BLOWOFF DOOR ASSEMBLY

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to missiles and more specifically the invention pertains to a missile airframe protective door assembly which covers an attitude control system (ACS) engine during missile launch, and which is jettisoned when the ACS engine is fired.

A missile's attitude refers to the missile's inflight position with respect to its inclinations with regards to a specific frame of reference. This frame of reference is often the axes of the missile with respect to the earth's surface.

Endoatmospheric missiles can make use of tail fin stabilization systems, but exoatmospheric missiles often use gimbaled engines in mounts as part of an attitude control system. These engines operate as Vernier engines that adjust the attitude of a missile while a main engine provides most of the missile's thrust.

The current practice with a number of existing missile systems, is to fly the missile with no covering over the ACS engine. The disadvantage of this practice is that the ACS engine is susceptible to damage during both storage and launch operations. More specifically, the launch of a missile from a land-based launch tube can subject the ACS engine to heating from the exhaust of the main engine, and severe pebble damage in a pebble impact environment.

The task of providing a protective door to cover missile attitude control system engines during storage and launch is alleviated, to some extent, by the system's disclosed in the following U.S. patents; the disclosures of which are incorporated herein by reference:

U.S. Pat. No. 4,324,167 issued to Piesik;
U.S. Pat. No. 4,321,225 issued to Jelinek; and
U.S. Pat. No. 4,031,806 issued to Stark et al.

The Piesik '167 patent discloses a rear cover for rocket launch tubes providing a seal between the tube and the rear of the rocket. The Jelinek '225 patent relates to access door seals against a convex surface surrounding an opening in a missile casing. The Stark et al '806 patent relates generally to an internal umbilical connector for missiles. This patent discloses that doors are usually provided to close over the missile umbilical connector access in an effort to provide a substantially smooth aerodynamic surface over the missile umbilical connector access during flight of the missile.

While the above-cited references are instructive, a need remains to provide a means for protecting ACS engines during missile storage and launch. The present invention is intended to satisfy that need.

SUMMARY OF THE INVENTION

The present invention includes a protective door to cover missile attitude control system engines during storage and launch while still being easily jettisoned when the ACS engine is fired. The door attaches to the missile skin by a hook on its lower edge and by a tapered boss which attaches to the skin and fits into a tapered hole near the door upper edge. Behind the door, the ACS engine nozzle is surrounded by a seal housing which prevents engine gases from escaping into the body of the missile and causing a pressure buildup when the engine is fired. At pressures between 35 and 60 psi, the door retainer screw fails in tension and the door is blown off.

As described above, it is a principal object of the present invention to provide a means for protectively covering the attitude control system engines of missiles during storage and launch operations.

It is another object of the present invention to provide a protective door assembly with a door plate that is jettisoned by the ACS engine when it ignites.

These together with other objects, features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

The present invention includes a protective door assembly which provides a means for covering missile attitude control system engines during storage and launch, and which is easily jettisoned when the ACS engine is fired.

Figure 1:
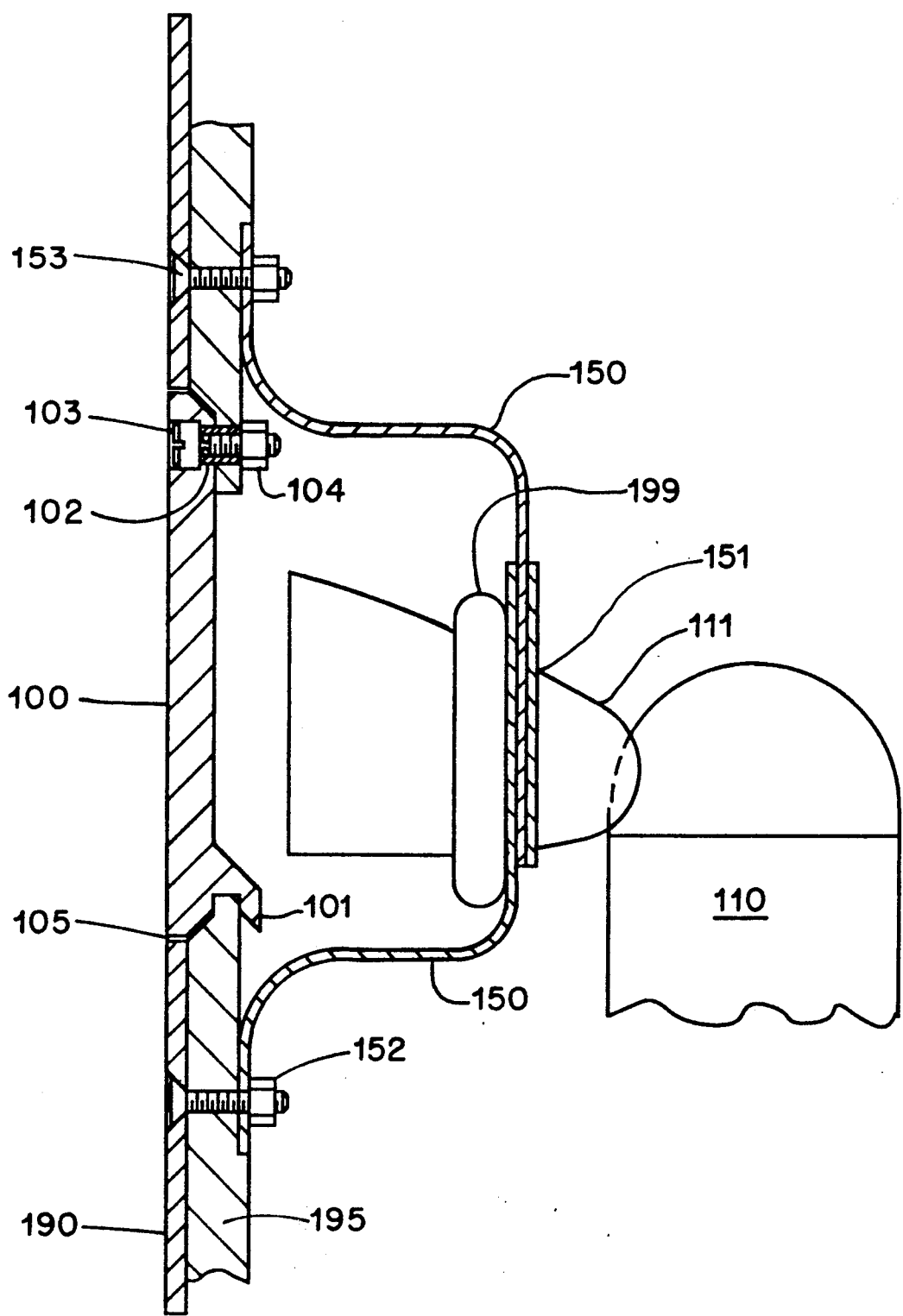
FIG. 1 is a illustration of a side view of the present invention.

The reader's attention is now directed towards FIG. 1 which is an illustration of the application of the preferred embodiment of the present invention. The system of FIG. 1 is a protective door assembly which uses a titanium door plate 100 as the protective cover of an ACS engine 110. The door plate 100 includes a door hook 101 and a door plate boss 102 which latches the door plate 100 to a reinforced retainer assembly 195 which is in turn fixed to the missile skin 190.

Both the door plate 100 and reinforced retainer assembly 195 may be made of titanium, and are each depicted in FIG. 1 as having about twice the thickness of the missile skin 190. This titanium construction is able to withstand aeroheating and the severe pebble impact environment of missile launch and flight operations, and yet is easily jettisoned in the manner described below.

At the upper end of the door plate 100 is a tapered door plate boss 102. This boss is a projecting stud which fits into a tapered hole in the reinforced retainer assembly 195, and which is held in place by a retainer screw 103 and nut 104. The taper on the boss assures that the door can swing free of the boss during jettison and can also be easily installed. All shear loads on the door are carried through the boss, therefore, the shallow taper assures that only a minimal radial component develops from shear loading. Loads on the door result from normal launch vibration, aerodynamic friction, and shallow angle pebble impact.

Operational loads in the radial direction are minimal and are resisted by the door retainer screw which is threaded 0-80 and is necked down just beneath the head. Because the screw is exposed to external heating (aerofriction and nuclear induced heating) and must break predictably over a wide temperature range, Inconel was selected as the screw material. Behind the door, the ACS engine nozzle 111 is surrounded by a seal housing 150 which prevents engine gasses from escaping into the body of the missile and causing a pressure buildup when the engine is fired. At pressures between 35 and 60 psi, the door retainer screw fails in tension and the door is blown off.

In tests, this configuration has resisted launch vibration and multiple pebble impacts and has worked successfully.

The door plate 100 and reinforced retainer assembly 195 of the system described above should be constructed of titanium, or any other heat and blast resistant material. The retainer screw 103 and nut 104 are intended to break predictably when the ACS engine is fired, and are made of one of the Iconel metals. These are nickel-based alloys containing about 13% chromium, 6% iron, and a little manganese, silicon or copper. The size of screw 103 and the nut 104 are determined by its desired breaking point. For example, when the ACS engine of FIG. 1 provides a thrust, the retainer screw and nut 104 should have a relatively small diameter so that at pressures of 35-60 PSI, the retainer screw 103 fails or breaks. The tapered boss 102 will easily slip out of the hole in the reinforced retainer assembly 195 as the door plate 100 flips out and is jettisoned.

Note that in FIG. 1, the door hook 101 is little more than a projecting notch which is inserted over an extended edge of the reinforced retainer assembly 195 at the bottom of the door plate 100. The door hook is not required to break like the retainer screw does, and can be made of the same material as the rest of the door plate 100.

As mentioned above, the interior of the body of the missile is protected from the exhaust of the ACS engine 110 by the ACS engine seal housing 150. In FIG. 1, this engine seal housing 150 is shown as a shell which attaches to the reinforced retainer assembly 19 and the missile skin 190 by a set of retainer bolts 152 and 153.

Figure 2:
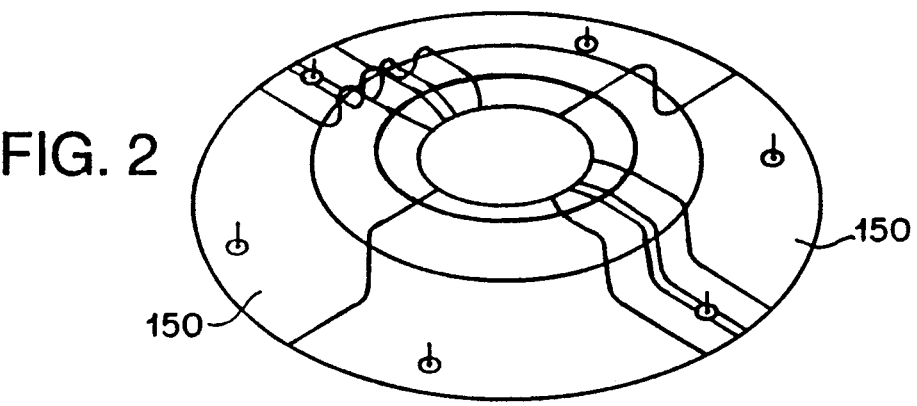
FIG. 2 is another view of the attitude control system engine seal of FIG. 1.

FIG. 2 is another view of the ACS engine seal housing 150 which shows that this shell is an annular ring which circumscribes the ACS engine nozzle 111 to prevent the exhaust of the engine 110 from entering the missile body. This shell may be constructed of titanium (like the door plate) or of any other heat and blast resistant substance used in current missile technology. FIG. 2 shows a central aperture in the seal housing, which allows it to surround the engine nozzle 111 just behind a retainer ring 199 (shown in FIG. 1).

Figure 3:
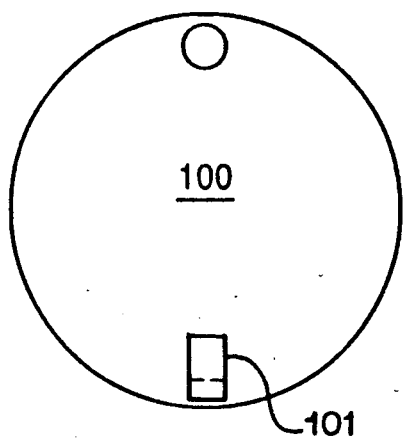
FIG. 3 is a plan view of the door plate of FIG. 1.
Figure 4:
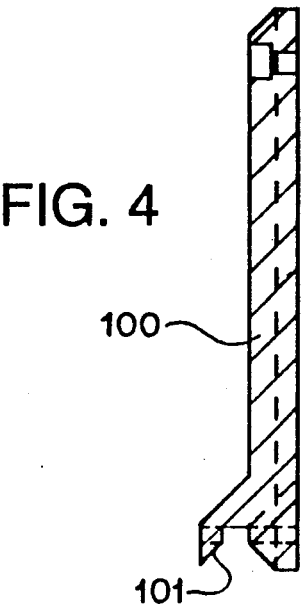
FIG. 4 is a detailed side view of the door plate of FIG. 1.

FIGS. 3 and 4 respectively depict a plan and a side view of the titanium door plate 100 of FIG. 1. FIG. 3 shows this plate to be a circular plate with the door plate boss 102 located at the top, and the door hook 101 located at the bottom. The side view of FIG. 4 provides more detail on the nature of the door hook 101. This hook has a shape designed to retain the door plate only as long as the retainer screw 103 holds the door plate boss 102 in place. The tapered inner edge of the hook 101 allows the door plate to easily flip away as soon as the retainer screw 103 fails.

The upper edge of the door plate 100 is shown in FIG. 4 to have recessed aperture through which the door plate boss 102 and the retainer screw 103 are inserted to fix the door plate 100 to the reinforced retainer assembly 195 of FIG. 1. The door plate boss 102 in this embodiment can be a hollow cylinder through which the retainer screw is inserted. As mentioned above, the purpose of this boss is to provide a stud with a tapered outer edge which allows the door plate to easily slide out when the retainer screw 103 fails. The use of just the retainer screw and its nut can serve to fix the door plate 100 to the retainer assembly 195, but it is possible that some of the threads of the retainer screw could catch on the retainer assembly when the door plate is supposed to be jettisoned. The use of a smooth cylinder that covers the retainer screw threads (except at the ends where it screws into a nut) ensures the user of this system that when the screw 103 fails, the door plate 100 will flip away from the missile as a result of the ACS engine blast.

Figure 5:
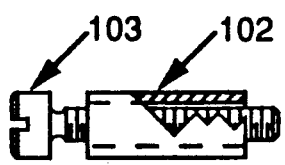
FIG. 5 is a side view of the door plate boss and retainer screw used in FIG. 1.

FIG. 5 is a side view of the door plate boss 102 and retainer screw 103 of FIG. 1. As described above, the door plate is jettisoned when the retainer screw fails. The door plate boss 102 is a metal cylinder which fits loosely over the threads of the retainer screw 103 so that they don't catch on the frame and inadvertently retain the door plate when it is intended to be jettisoned by the exhaust of the ACS engine 110.

Returning to FIG. 1, it must be emphasized that the door plate assembly of the present invention allows the ACS engine to jettison the door plate because of the predictability of the stress level required for the failure of the retainer screw. In the preferred embodiment, Iconel was selected as the screw material. Iconel X is an alloy produced by the International Nickel Company, and has the chemical composition listed below in Table 1. Other suitable candidates for the retainer screw and their compositions are as listed below in Table 1.

TABLE 1

| | Compositions of Superalloys | | | | | | | | | | | | | |
|---|---|---|---|---|---|---|---|---|---|---|---|---|---|---|
| | Ni | Co | Cr | Fe | Mo | W | Ta | Nb | Ti | Al | V | Mn | Si | C | N |
| Refractaloy 26 | 38 | 20 | 18 | 16 | 3.2 | — | — | — | 3.0 | 0.2 | — | 0.8 | 1.0 | 0.03 | — |
| Refractaloy 70 | 21 | 30 | 20 | 14 | 8 | 4.2 | — | — | — | — | — | 2.0 | 0.3 | 0.04 | — |
| Refractaloy 80 | 20 | 30 | 20 | 14 | 10 | 5 | — | — | — | — | — | 0.6 | 0.7 | 0.10 | — |
| K-42-B | 42 | 22 | 18 | 14 | — | — | — | — | 2.1 | 0.2 | — | 0.7 | 0.7 | 0.03 | — |
| S-590 | 20 | 20 | 20 | 27 | 4.0 | 4.0 | — | 4.0 | — | — | — | 1.5 | 0.6 | 0.43 | — |
| S-816 | 20 | 41 | 20 | 4 | 4.0 | 4.0 | — | 4.0 | — | — | — | 1.5 | 0.6 | 0.37 | — |
| 100 NT-2 | 30 | 20 | 20 | | 3 | 2.2 | 2 | — | — | — | — | 1.5 | 0.5 | 1.0 | — |
| 111 VT2-2 | — | 67 | 23 | — | 6 | — | 2 | — | — | — | — | — | — | 1.1 | — |
| Inconel X | 73 | — | 15 | 7 | — | — | — | 1.0 | 2.5 | 0.7 | — | 0.7 | 0.4 | 0.04 | — |
| Nimonic 80 | 77 | — | 20 | 3 | — | — | — | — | 2.5 | 0.5 | — | 0.4 | 0.5 | 0.05 | — |
| Cromadur | — | — | 12.5 | — | | 1 | — | — | — | — | 0.25 | 18 | — | — | 0.2 |
| Tinidur | 30 | — | 15 | | | — | — | — | 1.8 | — | — | — | — | 0.1 | — |
| Vanidur | 10 | — | 18 | | | — | — | — | 0.6 | — | 1 | — | — | 0.1 | — |

The diameter of the retainer screw 103 in FIG. 1 is determined by the alloy selected and its stress rupture strength. For a stress failure level of 35-60 psi, the screw diameter for Iconel X would be about 0.2 inches, but in each application, the user of the present invention is encouraged to empirically measure the actual stress required for candidate retainer screws, and to make the selection of the screw diameter size accordingly.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A protective door assembly for use with a missile which houses an attitude control system engine within its missile skin; said protective door assembly comprising:
   a frame which is attached to said missile skin; and
   a means for covering said attitude control system engine during storage and launch operations, said covering means being fixed to said frame and being jettisoned by said attitude control system engine when said attitude control system engine is activated.

2. A protective door assembly, as defined in claim 1, wherein said covering means comprises:
   a door plate which is attached to said frame so that it covers said attitude control system engine; and
   a means for fixing said door plate to said frame so that said door plate remains in place during the storage and launch of said missile, and which allows said door plate to be jettisoned when said attitude control system engine ignites.

3. A protective door assembly, as defined in claim 2, wherein said fixing means comprises:
   a hook which connects the door plate's bottom half with said frame, said hook comprising a beveled appendage which projects into a notch in said frame so that said door plate's bottom half is fixed adjacent to said missile skin as long as said door plate's top is held in place, said beveled appendage of said hook easily sliding out of said notch of said frame when the top half of said door plate is released from said frame; and
   a means for attaching the top half of said door plate to said frame, said attaching means having a stress level which causes it to fail when said attitude control system engine ignites so that said door plate is jettisoned from said missile.

4. A protective door assembly, as defined in claim 3, wherein said attaching means comprises:
   a metal screw which has a diameter and a chemical composition which is selected to cause said metal screw to have a failure at a stress level produced on it by exhaust of said attitude control system engine on said door plate, said metal screw being inserted through a first aperture on the top half of said door plate, and through a second aperture in said frame; and
   a nut which is connected to threads of said metal screw so that the metal screw holds the top half of said door plate to said frame until the metal screw experiences a failure caused by the exhaust of said attitude control system engine on said door plate.

5. A protective door assembly, as defined in claim 4, wherein said door plate, said hook and said frame are composed of titanium metal.

6. A protective door assembly, as defined in claim 5, wherein said metal screw is composed of a material selected from a group consisting of: Iconel metals, Refractaloy 26, Refractaloy 70, Refractaloy 80, Nimonic 80, Cromadur, Tinidur, and Vanidur.

7. A protective door assembly, as defined in claim 6, wherein said attitude control system engine produces a thrust ranging between 35 and 60 psi, and wherein said metal screw is composed of Iconel X and has a diameter of about 0.2 inches.

8. A pressure activated door system which isolates a compartment when its interior has an interior pressure which approximately equates that of an exterior pressure which is outside of the compartment, said pressure activated door system opening when a pressure difference between said interior pressure and said exterior pressure surpasses a pressure threshold, said pressure activated door system comprising:
   a frame which is attached to said compartment and which circumscribes an opening in said compartment;
   a door plate which covers said opening when it is attached to said frame;
   a hook which connects a first side of the door plate with said frame, said hook comprising a beveled appendage which is fixed to said door plate and which projects into a notch in said frame so that the first side of the door plate is fixed adjacent to the compartment as long as the door plate's second side is held in place, said beveled appendage of said hook easily sliding out of said notch in said frame when the second side of the door plate is released from said frame; and
   a means for holding the second side of said door plate to said frame, said holding means being a mechanical part which has a stress level which causes it to fail when said pressure pressure difference exceeds said pressure threshold, said holding means detaching said second side of said door plate from said frame when the holding means fails.

9. A pressure activated door system, as defined in claim 8, wherein said holding means comprises:
   a metal screw which has a diameter and a chemical composition which is selected to cause it to fail and break when said pressure difference surpasses said pressure threshold, said metal screw being inserted through a first aperture on said second side of said door plate, and through a second aperture in said frame; and
   a nut which is connected to threads of said metal screw so that the metal screw holds the second side of said door plate to said frame until the metal screw experiences a failure and breaks.

10. A pressure activated door system, as defined in claim 9, wherein said door plate, said hook and said frame are composed of titanium metal.

11. A protective door assembly, as defined in claim 10, wherein said metal screw is composed of a material selected from a group consisting of: Iconel metals, Refractaloy 26, Refractaloy 70, Refractaloy 80, Nimonic 80, Cromadur, Tinidur, and Vanidur.

12. A protective door assembly as defined in claim 11, wherein said metal screw is composed of Iconel X and has a diameter of 0.2 inches.

13. A protective door assembly for use with a missile which houses an attitude control system engine within its missile skin, said protective door assembly comprising:
- a frame which is fixed to said missile skin and which circumscribes an exhaust aperture through which said attitude control system engine emits its exhaust;
- a door plate which covers said exhaust aperture when it is attached to said frame said door plate having a beveled appendage on its bottom half which projects into a notch in said frame to hold the door plate in place when its top half is secured to said frame, said beveled appendage easily sliding out of said notch in said frame when said top half of said door plate becomes disengaged from said frame;
- a door plate boss which attaches the top half of said door plate to said frame, said door plate boss being capable of breaking and allowing said door plate to be jettisoned when said attitude control system engine ignites; and
- a means for sealing the missile's interior from exhaust from said attitude control system engine when it is operating and said door plate is jettisoned, said sealing means being fixed to said frame and said attitude control system engine within said missile skin.

14. A protective door assembly, as defined in claim 13, wherein said door plate boss comprises:
- a metal screw which has a diameter and a chemical composition which is selected to cause said metal screw to have a failure at a stress level produced on it by exhaust of said attitude control system engine on said door plate, said metal screw being inserted through a first aperture on the top half of said door plate, and through a second aperture in said frame;
- a nut which is connected to threads of said metal screw so that the metal screw holds the top half of said door plate to said frame until the metal screw experiences a failure caused by the exhaust of said attitude control system engine on said door plate; and
- a metal cylinder which is loosely placed over said threads of said metal screw to allow it to pull free when it fails.

15. A protective door assembly, as defined in claim 14, wherein said door plate, said hook and said frame are composed of titanium metal.

16. A protective door assembly, as defined in claim 15, wherein said metal screw is composed of a material selected from a group consisting of: Iconel metals, Refractaloy 26, Refractaloy 70, Refractaloy 80, Nimonic 80, Cromadur, Tinidur, and Vanidur.

17. A protective door assembly, as defined in claim 16, wherein said attitude control system engine produces a thrust ranging between 35 and 60 psi, and wherein said metal screw is composed of Iconel X and has a diameter of about 0.2 inches.

18. A protective door assembly, as defined in claim 17, wherein said sealing means comprises a titanium metal skin which is fixed to said frame and to an exhaust nozzle of said attitude control system in a manner that allows it to circumscribe said exhaust aperture and seal the missile's interior from the exhaust of the attitude control system engine when it is operating.

* * * * *